Dec. 22, 1953          C. P. KLÖPPING              2,663,820
             SHORT-WAVE ELECTRIC DISCHARGE TUBE
                    Filed Sept. 5, 1952
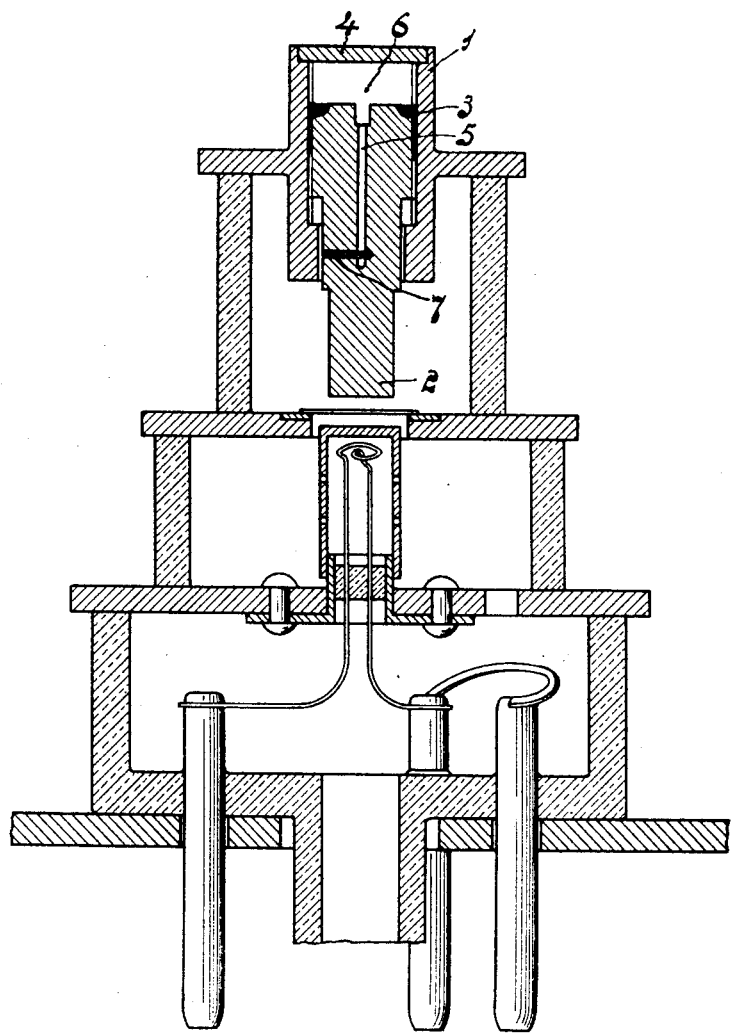
                              INVENTOR
                        CAREL PETER KLÖPPING
                    BY
                              Fred M Vogel
                                      AGENT Patented Dec. 22, 1953

2,663,820

UNITED STATES PATENT OFFICE 2,663,820

SHORT-WAVE ELECTRIC DISCHARGE TUBE

Carel Peter Klöpping, Eindhoven, Netherlands, assignor to Hartford National Bank and Trust Company, Hartford, Conn., as trustee Application September 5, 1952, Serial No. 308,051

Claims priority, application Netherlands October 6, 1951

2 Claims. (Cl. 313—282)

This invention relates to short wave tubes according to principal patent (patent application 277,216 (Ph. 11,135)), which tubes comprise flat electrodes, of which at least one is screwed into a tubular member connected to the wall of the tube, said member being closed in a vacuum-tight manner by a metal disc welded in the outer end of the tubular member and the electrode itself possessing a duct or bore through which the air enclosed between the electrode and the welded disc can be carried off.

It has been found that the operation of the tube may be impaired by loose particles, for example dust, drops of solder or very small welding drops which may gain access to the interior of the tube through the electrode duct. Since the electrodes in such tubes are placed very close together extremely small loose particles and metal grains are able to produce short-circuits. In accordance with the invention this is avoided by introducing into said duct a filter wad consisting of thin metal wire. As the duct generally has a small diameter it is extremely difficult to introduce a plug into the duct in such manner as to prevent splinters or dust particles becoming detached from the material of the plug itself. For this reason the filter wad preferably consists of a single wire. The customary filter materials, for example glass wool or metal wool consisting of a large number of wire parts are unsuitable in this case. Moreover, the electrode, often the anode, usually has a comparatively high temperature during operation of the tube. It has been found that it is advantageous to provide wads of metal wire having a diameter of less than 1/50 of the diameter of the duct without failure and breaking off of parts of the metal wire. To this end only metals practically enter into account which can be drawn out to a very small diameter, for example tungsten, molybdenum and, if desired, platinum. Since the duct has, in general, a diameter of approximately 1 mm. only wire of less than 20 microns in diameter enters into account. The metal filter wad is required to pass air and other gases but to retain particles having a diameter of 20 microns and less. To this end the diameter of the filter wire should be as small as possible. Since short wire ends become easily detached and find their way into the tube, the filter wad must consist of a single or only a few wire lengths.

In order that the invention may be readily carried into effect, it will now be described in detail with reference to the accompanying drawing which shows, by way of example, one tube according thereto and in which:

The reference numeral 1 denotes a tubular member which is sealed into the wall of the tube and into which the anode 2 proper is screwed. The anode 2 is fixed by means of solder 3 and subsequently the member 1 is sealed by means of a welded disc 4.

The anode 2 is provided with a duct 5 for carrying off air and gases enclosed in the space 6 between the anode 2 and cover 4. According to the invention the duct contains a filter wad 7 consisting of thin metal wire by which dust and metal particles become detached, for example from the screw-thread of part 1, and small solder or welding grains or the like are retained. The wad may simply be made by hand and be pushed into the duct by means of a rod prior to screwing the anode into the tubular member, it being preferably introduced into the lateral part of the duct, so that any loose particles initially present in the duct are pushed back.

What I claim is:

1. A disc-seal electric discharge tube comprising an envelope, a tubular member sealed in the envelope, an electrode containing a duct for evacuation purposes in threaded engagement with said tubular member, a metal disc welded to the outer end of said tubular member to form a vacuum-tight seal therewith, and a filter member disposed in said duct to prevent small particles from entering the interior of the envelope, said filter member consisting of a wad of not more than a few thin wires of a metal selected from the group consisting of tungsten and molybdenum, each of said wires having a diameter of less than 20 microns.

2. A disc-seal electric discharge tube as claimed in claim 1 in which the filter member consists of a single metal wire.

CAREL PETER KLÖPPING.

References Cited in the file of this patent

UNITED STATES PATENTS

| Number | Name | Date |
|---|---|---|
| 1,025,635 | Machlett | May 7, 1912 |
| 1,182,709 | Roch | May 9, 1916 |
| 1,276,568 | Regnier | Aug. 20, 1918 |
| 1,877,726 | Noble | Sept. 13, 1932 |